United States Patent Office 2,867,493
Patented Jan. 6, 1959

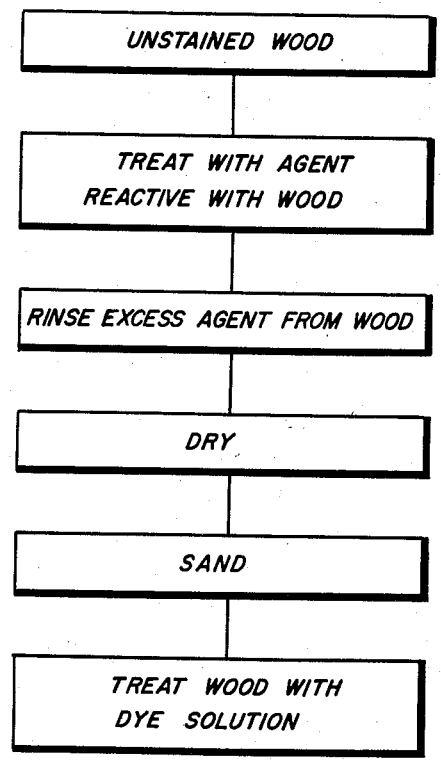

2,867,493

ACTIVATION OF WOOD FOR DYEING ACID DYESTUFFS

Herman R. Nack, Troy, Ohio, assignor to Chadeloid Corporation, Dayton, Ohio, a corporation of Delaware Original application November 6, 1951, Serial No. 255,102, now Patent No. 2,733,119, dated January 31, 1956. Divided and this application June 27, 1955, Serial No. 521,213

5 Claims. (Cl. 8—6.5)

This invention relates to a method of staining wood. It is a primary object of the invention to provide a method for the staining of woods which is effective to highlight contrasting effects present in the natural wood. This objective is attained through reduction of the effect of knots, gum spots, grain formations, and so forth.

A further object of the invention is the provision of a method for the staining of woods which results in more uniform distribution of the staining dye, and a higher and more penetrating dye deposit than has hitherto been attainable.

These and other allied objectives of the invention are attained by providing a treatment for the unstained wood, which treatment conditions the surface of the wood for receipt of the staining dye. Thus in the process of invention the unstained wood is first subjected to the action of an agent capable of changing the reactive nature of the wood surface and the surface is then treated with a dye having reactive characteristics such that it will be attracted and bound to the wood.

More specifically the process involves treating an unstained wood such as mahogany, poplar or walnut with an agent which acidifies or oxidizes the wood, or with an agent which creates a basicity or reduction of the wood surface, and thereafter contacting the treated wood with a dye having basic or acidic properties in the opposite sense. That is, an acidified wood surface would be treated with a dye having basic properties and vice versa.

As acidic and/or oxidizing constituents sodium hypochlorite water solutions, or a 0.5% nitric acid solution may be utilized. The concentration of the hypochlorite when such is employed may vary from about 1% to 15% by weight.

The base or reducing agents may include sodium hydrosulphide or stannous chloride and the concentration in water may preferably be in the range of between about 1 to 15% by weight.

Dyes suitable in conjunction with the oxidizing or acid treatment include particularly Brilliant Green Crystals, Color Index No. 662; Fuchine G S, Color Index 677; these dyes are adaptable especially where high penetration of the wood is required although it will be understood that others of the same characteristics indicated may be utilized and the invention is not to be considered as limited to a particular dye.

Similarly preferred acidic dyes include Calcocid Fast Light Orange 2 G, Color Index 27, and Calcocid Yellow MXXX Conc., Color Index 138.

The concentrations of the dyes, which are employed in solution form, may vary between about ½% to 7% depending upon the particular dye desired to be produced. With the acid dyestuffs the preferred solvent is carbitol, the ethyl ether of diethylene glycol, while the basic dyestuffs may be employed in ethyl alcohol, or "Cellosolve," the monoethyl ether of ethylene glycol. Solvent selection is not critical and those solvents customarily effective with particular dyestuffs may be utilized in the inventive process.

The invention will be more fully understood by reference to the accompanying flow sheet and the following detailed examples:

Example I

Unstained walnut is first subjected to a water solution containing 10% sodium hypochlorite by weight for about ten minutes, the treated wood is then rinsed in methanol, dried and lightly sanded to a smooth surface. The clean dry wood is then sprayed with a 4% solution of Brilliant Green Crystals in alcohol and dried.

The resultant product will be more strongly and effectively stained, with a greater degree of uniformity than a similar wood sample produced without the preliminary hypochlorite treatment.

Example II

A poplar wood panel may be subjected to the action of a 5% solution of sodium hypochlorite for about 15 minutes, and after rinsing with methanol, drying and sanding, sprayed with a 3% solution of Fuchsine CS, CI 677 in the ethyl ether of diethylene glycol.

The resultant panel will be superior in coloration to panels treated with higher dye concentrations but which were not given the initial hypochlorite treatment.

Example III

A walnut panel may be treated with a 5% solution of sodium hydrosulphide in water for about 10 minutes, then rinsed, dried and sanded. A 3% solution of an acid dyestuff, Calcocid Yellow MXXX Conc. CI 138 may then be sprayed onto the clean wood and thereafter dried. The product will exhibit improved quality, particularly as to the depth, over a panel not subjected to the hydrosulphide step. More uniform staining permitting ease of matching will also be attained in the product.

Example IV

A mahogany panel may be subjected to an 8% solution of stannous chloride in water for about 15 minutes, then rinsed with alcohol, dried and sanded. A spray of a solution containing about 7% Calcocid Fast Light Orange 2 G, Color Index 27, may then be directed onto the panel. The panel when dried will exhibit a deep coloration with improved fading properties over a panel prepared without the initial treatment.

In connection with the stannous chloride solution in water it may be noted that this solution preferably should be freshly prepared in order to minimize any premature oxidative tendency to the stannic ion.

Acidification of the stannous solution should in general be avoided, for though the same normally tends to prevent hydrolysis of the stannous, if freshly prepared this factor will be overcome and the adverse effect of acid on the wood, where undesirable, will not be encountered.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. A process of staining wood to provide an improved penetrating stain on wood which comprises the steps of subjecting the surface of the unstained wood to the action of a sodium hydrosulphide solution having a concentration of about 1 to 15% by weight of the hydrosulphide in water, drying the wood, and thereafter treating the dried wood with an acidic reacting dye in solution.

2. A process of staining walnut wood comprising the steps of subjecting the unstained wood to the action of a 5% solution of sodium hydrosulphide in water for about 10 minutes, rinsing the treated wood with alcohol, drying and sanding the wood, and thereafter spraying the wood with a 3% solution of an acid dyestuff, and drying the product.

3. In a process of staining wood with a dye, the step of initially chemically treating the surface of the unstained wood by the application thereto of an aqueous solution of a salt selected from the group consisting of an oxidizing water-soluble salt and a water-soluble reducing salt, and thereafter contacting the thus treated wood surface with a dye to stain the same, said dye being selected from the group consisting of an acid dyestuff and a basic dyestuff, and wherein said acid dyestuff is applied to wood pretreated with said reducing salt and said basic dyestuff following pretreatment of the wood with said oxidizing salt.

4. A process of staining wood which comprises treating the surface of the unstained wood with a 5% aqueous solution of sodium hydrosulphide, rinsing the thus treated wood with water, drying and sanding, and applying to the resultant clean, sanded wood surface an acid dyestuff which penetrates into the wood and stains the wood uniformly.

5. A process of staining wood which comprises treating the surface of the unstained wood with a 5% aqueous solution of sodium hypochlorite, rinsing the thus treated wood with water, drying and sanding, and applying to the resultant clean, sanded wood surface a basic dyestuff which penetrates into the wood and stains the wood uniformly.

References Cited in the file of this patent

UNITED STATES PATENTS

| | | |
|---|---|---|
| 755,993 | Brenner | Mar. 29, 1904 |
| 1,792,805 | Broderick | Feb. 17, 1931 |
| 1,876,329 | Loetscher | Sept. 6, 1932 |
| 2,733,119 | Nack | Jan. 31, 1956 |

OTHER REFERENCES

Textile Colorist for June 1937, pp. 25, 26 (art. by Rice).